United States Patent Office 3,809,684
Patented May 7, 1974

3,809,684
PROCESS FOR THE PRODUCTION OF HOMO-
POLYMERS AND CO-POLYMERS OF EPISUL-
PHIDES AND PRODUCT THEREOF
Arnaldo Roggero, Alessandro Mazzei, and Antonio Proni,
San Donato Milanese, Italy, assignors to Snam Progetti,
S.p.A., San Donato Milanese, Italy
No Drawing. Filed May 24, 1972, Ser. No. 256,250
Claims priority, application Italy, May 24, 1971,
24,896/71
Int. Cl. C08g 23/00
U.S. Cl. 260—79                                9 Claims

ABSTRACT OF THE DISCLOSURE

Episulfides such as etthylene sulfide, propylene sulfide and allyloxy-(2,3)-epithiopropane are polymerized or co-polymerized by bringing one or more of those monomers into contact with a catalytic quantity of a hydride of an alkaline earth metal or the product of the reaction of an alkali metal, an alkaline earth metal, a hydride or an alkyl derivative of one of those metals, with a dialkyl, dicycloalkyl or diaryl sulfoxide or sulfone in a polar solvent, at a temperature in the range of −20° to 20° C.

---

The present invention relates to a process for the production of homopolymers and co-polymers of episulphides, as well as the products obtained by means of said process.

More particularly the present invention relates to a process of polymerization and co-polymerization of episulphides which makes use of particular catalyst systems in polar solvents.

The catalysts used in the polymerization process, according to the present invention, may be chosen from a wide class of compounds; preferably, the catalysts belonging to one of the following groups are used:

(a) reaction products between an alkali or alkaline-earth metal, and its hydride or alkyl derivative with dialkyl, dicycloalkyl, diaryl and aralkyl sulphoxides or sulphones;
(b) hydrides or alkyl derivatives of the alkali or alkaline-earth metals. Illustrative examples of catalysts that may be used with advantage in the practice of our invention are lithium-di-methylsulphoxide, sodium- and potassium-dimethyl-sulphoxide, diethyl-magnesium in mixture with dimethyl-sulphoxide, diethyl-magnesium in mixture with hexamethyl-phosphor-amide and the like.

The catalyst may be added to the reaction medium over a wide range of concentrations, with respect to the monomer or monomers employed; in particular it may vary from 0.001% to 20% (molar concentration) and preferably for economic reasons, may fall in the range 0.01 and 0.5% (in moles) of monomer employed. As noted above, the polymerization reaction according to the present invention, is effected in the presence of a solvent in which there is an appropriate equilibrium between donor strength and dielectric constant. Illustrative examples of solvents advantageously used in the present invention are hexamethyl-phosphor-amide (HMPA), dimethyl-sulphoxide (DMSO), tetrahydrofuran (THF), dimethyl-formamide (DMF), N,N'-dimethylacetamide, Pyridine (Py), acetonitrile, dioxane, morpholine, formyl-morpholine and their ethers as well as mixtures of said solvents.

Our new process may be carried out over a wide range of temperatures; particularly between −80° and +50° C. and advantageously between −20° and +20° C.

Our new polymerization reaction makes it possible to obtain homopolymers, copolymers and terpolymers from saturated or unsaturated episulphides.

Examples of the former are given by ethylene sulfide, propylene sulfide, styrene-sulphide, cyclohexene sulfide, isobutene sulfide, whereas the latter may be chosen among allyloxy-(2,3)-epithiopropane, butadiene mono-episulphide, vinylcyclohexenmonoepisulphide and the like.

The process according to the present invention, has proved to be very advantageous for obtaining polymers of propylene sulfide, copolymers of propylene sulfide and allyloxy-(2,3)-epithiopropane, propylene sulfide and ethylene sulfide and ter-polymers based on propylene sulfide, ethylene sulfide and allyloxy-(2,3)-epithiopropane. The polymers so obtained have a particularly high molecular weight and are of value either as saturated homopolymers in the field of plastic materials (very good mechanical properties), or as unsaturated copolymers, which can be vulcanized with sulphur, in the field of elastomers resistant to oils. In particular, in the last application, they are superior to the common rubber (nitrile rubber, polychloroprene, and so on) by virtue of their very low swelling in solvents and of their good technological properties.

The advantages derived from the use of the catalysts according to the present invention, the operational features and the particular products obtained will be evident from the following examples given only by way of illustration.

EXAMPLES 1–3

In a bottle having a capacity of 250 cc., after having evacuated the air, 30 cc. of tetrahydrofuran (THF) and 10 cc. of propylene sulfide (hereinafter sometimes referred to as PS) equal to 127 mmoles are charged in a nitrogen atmosphere. The bottle is refrigerated to −10° C. and a solution of lithium methylsulphoxide (LiDMSO) in 10 cc. of dimethylsulphoxide (DMSO) is dropped slowly in it. The bottle is placed in a thermostatically controlled bath and the polymer is recovered at the end of the reaction by coagulation with methanol. Three reactions of polymerization are carried out with the same quantity of propylene sulphide, by varying the temperature and the quantity of catalyst. The reaction conditions and the results obtained are shown in Table I.

TABLE I

| Example | T., ° C. | Catalyst (mmoles) | Obtained polymer (grams) | $[\eta]_{tol.}^{30°C.}$ (dl./g.) | Conversion, percent |
|---|---|---|---|---|---|
| 1 | 0 | 0.127 | 7.6 | 1.79 | 81 |
| 2 | 0 | 0.381 | 8.6 | 1.28 | 91.5 |
| 3 | 20 | 0.635 | 9.4 | 0.81 | 100 |

EXAMPLES 4–9

By making use of the previously described apparatus, 127 mmoles of propylene sulfide are polymerized utilizing sodium-di-methyl-sulphoxide as catalyst. Different tests have been carried out by varying the quantity of catalyst, its solvent, the polymerization solvent and the temperature.

The working conditions and the results obtained are shown in Table II.

TABLE II

| Example | T., °C. | Catalyst mmoles | Polymerization solvent | Catalyst solvent | Polymer obtained (g.) | $[\eta]^{30°C.}_{tol.}$ (dl./g.) | Conversion percent | Polymerization time (hours) |
|---|---|---|---|---|---|---|---|---|
| 4 | 0 | 0.127 | THF (38 cm.³) | DMSO (1.8 cm.³) | 8.7 | 1.31 | 92.5 | 40 |
| 5 | 0 | 0.381 | THF (35 cm.³) | DMSO (5.4 cm.³) | 9.2 | 0.97 | 98 | 40 |
| 6 | 0 | 0.0316 | HMPA (40 cm.³) | HMPA (0.11 cm.³) | 3.1 | 0.4 | 33 | 2 |
| 7 | 0 | 0.0316 | HMPA (40 cm.³) | HMPA (0.11 cm.³) | 4.5 | 0.79 | 48 | 5 |
| 8 | 0 | 0.0316 | HMPA (40 cm.³) | HMPA (0.11 cm.³) | 6 | 0.85 | 64 | 20 |
| 9 | −20 | 0.254 | THF (39 cm.³) | HMPA (0.9 cm.³) | 9 | 1.03 | 95.6 | 20 |

NOTE.—THF=Tetrahydrofuran. HMPA=Hexamethyl-phosphor-amide. DMSO=Dimethylsulphoxide.

EXAMPLE 10

PS (127 mmoles) is polymerized at 0° C. by making use, as catalyst, of the potassium-dimethylsulphoxide (0.635 millimole) dissolved in DMSO (10 cc.) and as solvent the THF (30 cc.).

At the end of the reaction (2 hours), 8.8 g. (conversion of 93.5% of polymer having $$[\eta]^{30°C.}_{toluene}=0.303 \text{ dl./g.}$$

are obtained.

EXAMPLE 11

The copolymerization of PS (127 millimoles) and allyloxy 2,3-epithiopropane (9.25 millimoles) is effected at 0° C. by making use of 0.127 millimole of NaDMSO dissolved in HMPA (40 cc.). At the end of the polymerization 10.6 g. of copolymer (100% of conversion) are obtained having $[\eta]$ in toluene at 30° C. of 0.72 dl./g.

The copolymer is cured by making use of the following recipe.

| | Parts |
|---|---|
| Polymer | 100 |
| ZnO | 5 |
| MBTA=Mercaptobenzothiazole | 1 |
| TMTDS=Tetramethylthiuram disulfide | 2 |
| Sulfur | 2 |
| Stearic acid | 0.5 |

The technological data are as follows:

| | Raw polymer | Cured polymer |
|---|---|---|
| 100% modulus (kg./cm.²) | 0.54 | 13.1 |
| Tensile strength (kg./cm.²) | 0.27 | 19.5 |
| Elongation, percent | 400 | 135 |
| Permanent set | 33 | 0 |

The copolymer has been cured at 145° C. for 120 minutes.

EXAMPLE 12

By the above described procedure 30 cc. of THF, 10 cc. (127 millimoles) of PS and 2 cc. (15.4 millimoles) of allyloxy 2,3-epithiopropane are charged in the bottle. Afterwards a solution of LiDMSO (0.15 millimole) in 10 cc. of DMSO is added dropwise and the copolymerization is effected at 0° C.

10 g. (87.5% of conversion) of copolymer are isolated, which show a $[\eta]$ in toluene at 30° C. of 0.43 dl./g.

EXAMPLE 13

50 millimoles of ethylene sulfide (hereinafter sometimes referred to as E.S.) and 127 millimoles of P.S. are copolymerized at 0° C. by making use, as catalyst, of NaDMSO (0.127 millimole) in HMPA and by making use, as solvent, of HMPA (40 cm.³). At the end of the reaction, 11.4 g. of copolymer (92% of conversion) having $[\eta]$ in toluene at 30° C. of 0.69 dl./g. are obtained.

EXAMPLE 14

50 millimoles of ES, 127 millimoles of PS and 13 millimoles of allyloxy-2,3-epithiopropane are terpolymerized by making use, as catalyst, of NaDMSO (0.063 millimole) in HMPA (40 cc.). At a temperature of 0° C., 14 g. (100% of conversion) of terpolymer having $[\eta]$ in toluene at 30° C. of 0.8 dl./g. are obtained.

The product is cured by making use of the previously described recipe. The technological data are:

| | Raw polymer | Cured polymer |
|---|---|---|
| Modulus 100% (kg./cm.²) | 0.84 | 8.5 |
| Tensile strength (kg./cm.²) | 0.45 | 11 |
| Elongation, percent | 315 | 170 |
| Permanent set, percent | 137 | 0 |

EXAMPLE 15

By the above described procedure, 10 cc. (127 millimoles) of PS are polymerized by utilizing as catalyst a mixture of MgEt₂ (127 millimoles) and DMSO (molar ratio 1:50) treated at 60° C. in THF (40 cc.).

The polymerization is then carried out at 0° C., giving a yield in solid polymer of 8.9 g. (95% of conversion) with $[\eta]$ in toluene at 30° C. of 0.86 dl./g.

EXAMPLE 16

10 cc. (127 millimoles) of PS are polymerized by using MgEt₂ (1.27 millimoles) in HMPA (40 cc.) at 0° C. The yield in solid polymer is 9.4 g. (100% of conversion) with $[\eta]$ in toluene at 30° C. of 0.5 dl./g.

EXAMPLE 17

10 cc. (127 millimoles) of PS are polymerized with MgEt₂ (0.063 millimole) and DMSO (3.65 millimoles) in HMPA at 0° C. The yield in polymer is 9.4 g. (100% of conversion) with $[\eta]$ in toluene at 30° C. of 0.63 dl./g.

EXAMPLES 18–20

127 millimoles of propylene sulfide were polymerized by using, as catalyst, NaH. The conditions and the results are shown in Table III.

TABLE III

| Example number | T., °C. | Catalyst (millimoles) | Solvents | Polymer (g.) | $[\eta]$ 30° C. toluene (dl./g.) | Conversion, percent |
|---|---|---|---|---|---|---|
| 18 | 0 | 2.5 | HMPA (40 cm.³) | 8.2 | N.d. | 87 |
| 19* | 0 | 1.27 + HMPA (6.35) | THF (40 cm.³) | 8.7 | 0.97 | 92 |
| 20* | 0 | 1.27 + HMPA (6.35) | Toluene (40 cm.³) | 8.1 | 0.34 | 86 |

*The catalyst has been aged for 1 hour at 60° C.

EXAMPLE 21

The reaction product between NaH (1.27 millimoles) and dimethyl sulphone (1.27 millimoles) is used to polymerize 127 millimoles of PS. At the end of the reaction, effected at 20° C., 9.4 g. of polymer (100% of conversion) having $$[\eta]_{toluene}^{30°\,C.} = 1.43 \text{ dl./g.}$$

are isolated.

What is claimed is:

1. A process for the polymerization of episulphides which comprises polymerizing an episulphide in a polar solvent in the presence of a catalyst which is a member selected from the group consisting of the hydrides of alkaline earth metals and the products of the reaction of an alkali metal, an alkaline earth metal, or a hydride or an alkyl derivative thereof with a dialkyl, dicycloalkyl or diaryl sulphoxide or sulphone at a temperature in the range of −20° to 20° C.

2. Process as claimed in claim 1 characterized in that the polar solvent is a member selected from the group consisting of hexamethyl phosphoramide, dimethylsulphoxide, N,N'-dimethylacetamide, tetrahydrofuran, dimethylformamide, pyridine, acetonitrile, dioxane, morpholine, formyl morpholine and their mixtures.

3. Process as claimed in claim 1 characterized in that the catalyst is present in a molar concentration between 0.01% and 0.5%.

4. Process as claimed in claim 1 characterized in that a monomer which is a member selected from the group consisting of ethylene sulfide, propylene sulfide, styrene sulphide, cyclohexene sulphide and isobutene sulphide is polymerized.

5. Process as claimed in claim 1 characterized in that a monomer which is a member of the group consisting of allyloxy-(2,3)-epithiopropane, butadiene mono-episulphide and vinylcyclohexene mono-episulphide is polymerized.

6. Process as claimed in claim 4 characterized in that the monomer is propylene sulphide.

7. Process as claimed in claim 1 characterized in that ethylene sulphide and propylene sulphide are copolymerized.

8. Process as claimed in claim 1 characterized in that the monomers propylene sulphide and allyl-(2,3)-epithiopropane are copolymerized.

9. Process as claimed in claim 1 characterized in that the monomers propylene sulphide, ethylene sulphide and allyloxy-(2,3)-epithiopropane are terpolymerized.

References Cited

UNITED STATES PATENTS

| | | | |
|---|---|---|---|
| 3,222,324 | 12/1965 | Brodoway | 260—79.7 |
| 3,222,326 | 12/1965 | Brodoway | 260—79.7 |
| 3,317,489 | 5/1967 | Sander | 260—79 |
| 3,317,920 | 5/1967 | Sander | 260—79 |
| 3,365,429 | 1/1968 | Gobran et al. | 260—79 |
| 3,365,431 | 1/1968 | Gobran et al. | 260—79.7 |
| 3,489,728 | 1/1970 | Bailey, Jr. et al. | 260—79 |
| 3,515,704 | 6/1970 | Woodhams et al. | 260—79 |
| 3,624,052 | 11/1971 | Gobran et al. | 260—79 |
| 3,624,055 | 11/1971 | Gobran et al. | 260—79.7 |
| 3,655,634 | 4/1972 | Boucheron | 260—79 |

DONALD E. CZAJA, Primary Examiner

M. I. MARQUIS, Assistant Examiner

U.S. Cl. X.R.

260—37 R, 41 R, 79.1, 79.7

UNITED STATES PATENT OFFICE
CERTIFICATE OF CORRECTION

PATENT NO. : 3,809,684
DATED : May 7, 1974
INVENTOR(S) : Arnaldo Roggero, Alessandro Mazzei and Antonio Proni It is certified that error appears in the above-identified patent and that said Letters Patent are hereby corrected as shown below:

Column 1, line 15, correct spelling of "ethylene".

Column 2, line 8, change "styrene-sulphide" to read

--styrene sulphide--.

Column 6, after line 28, insert the following two lines:

-- Other Publications

Ledwith, et al, Proceedings of the

Chemical Society (London), 1964, page 108 --.

Signed and sealed this 15th day of July 1975.

(SEAL)
Attest:

RUTH C. MASON
Attesting Officer

C. MARSHALL DANN
Commissioner of Patents
and Trademarks